United States Patent

[11] 3,620,520

[72] Inventors: Robert H. Ross;
Robert C. Larko; Walter G. Swartzfager,
all of Meadville, Pa.
[21] Appl. No. 59,286
[22] Filed July 29, 1970
[45] Patented Nov. 16, 1971
[73] Assignee Sunbeam Equipment Corporation
Meadville, Pa.

[54] FURNACE HEATING CONTROL SYSTEM
10 Claims, 6 Drawing Figs.
[52] U.S. Cl. ................................. 263/40 R, 236/15 B, 263/52
[51] Int. Cl. ................................. F27b 3/10
[50] Field of Search ................................. 263/40 R, 52; 236/15 B

[56] References Cited
UNITED STATES PATENTS
1,923,145  8/1933  Harsch .................... 263/52
3,447,790  6/1964  Ross et al. .................... 263/40

Primary Examiner—John J. Camby
Attorney—George R. Clark

ABSTRACT: A furnace heating control system for a furnace using a gaseous heating media that passes through the workload for rapidly bringing the workload up to the desired processing temperature without any "overshoot" of the workload temperature. This control is accomplished solely as a function of the incoming and outgoing temperatures of the gaseous heating media through the workload. In combination with a reversible axial flow fan synchronously switched thermocouples continuously measure the incoming and outgoing temperatures, electrical signals proportional to the incoming and outgoing temperatures are compared to respective reference signals and any resulting excess signals are used to effect reversal of a motor normally driving a heat input valve in a direction so as to increase the heat input. In one embodiment a heating media temperature signal is compared against a variable reference signal which is proportional to the difference between the incoming and outgoing temperatures of the gaseous heating media.

Inventors:
Robert H. Ross
Robert C. Larko
Walter G. Swartzfager
By
John S. Pacocha
Atty

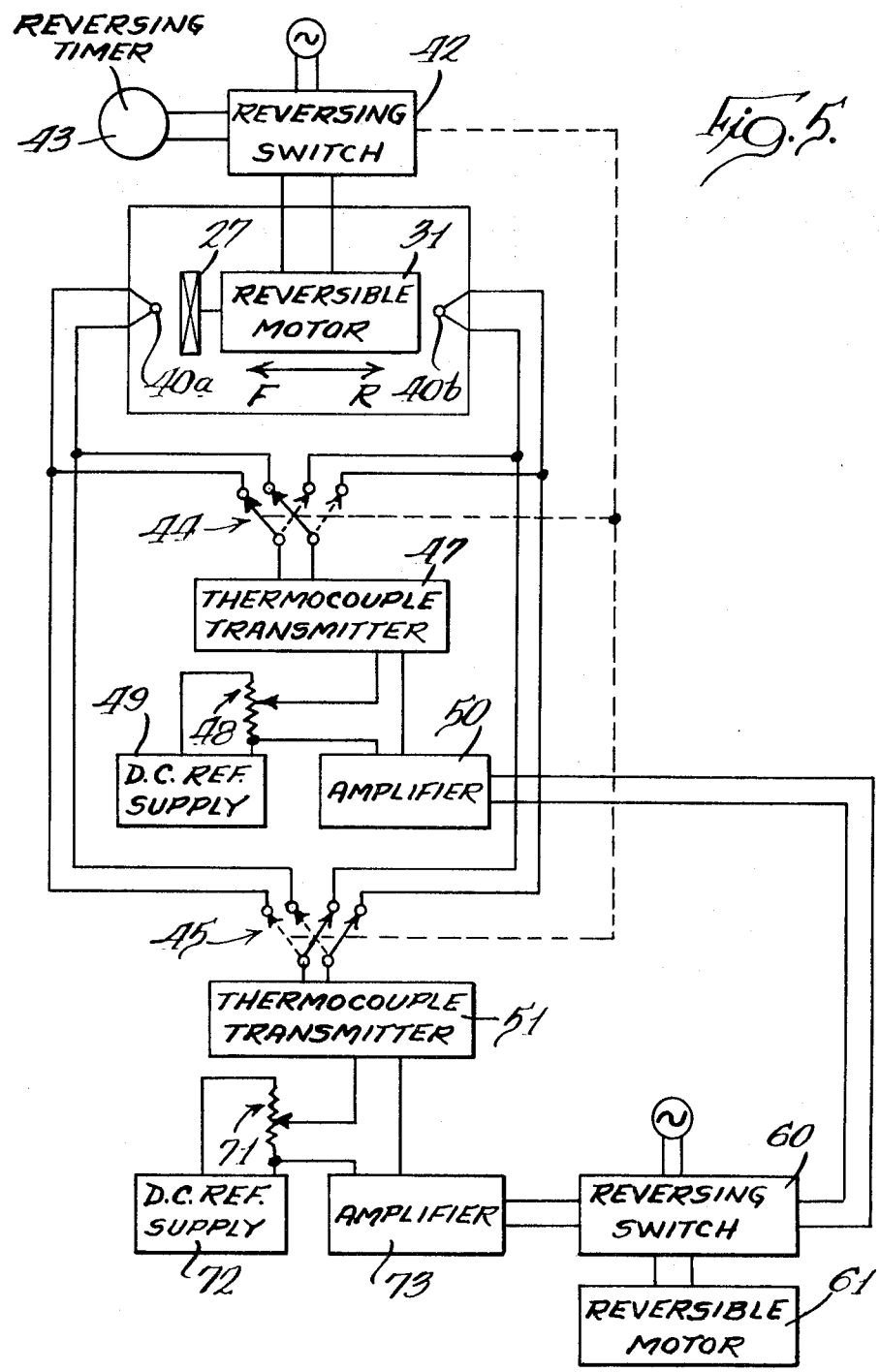

FURNACE HEATING CONTROL SYSTEM

BACKGROUND OF THE INVENTION

Bringing a heat treat workload up to the desired processing temperature without any overshoot of the workload temperature has always presented problems. The time at which any one heat treat workload must be maintained at a preselected processing temperature is, of course, determined by metallurgical factors not directly affected by the furnace control system. However, the useful time of a furnace for processing different heat treat workloads can be increased by more rapidly bringing the workload up to the preselected temperature. It has long been recognized that the time for bringing the workload up to heat can be decreased by initially maintaining a "thermal head," that is heating the furnace to a temperature somewhat above the preselected workload temperature. However, this thermal head cannot be maintained indiscriminately as it would result in the workload overshooting the preselected temperature. Such an overshoot would, for example, in the homogenizing of aluminum billets result in excessive, undesirable grain growth in the aluminum.

A considerable amount of development has taken place in the design of furnace-heating-control systems to rapidly bring the workload up to the processing temperature without any undesirable overshoot. These prior art control systems have been extremely complex inasmuch as they all require an actual measurement of work temperature. The measurement of the workload temperature present problems to the manufacturer of the heat-treating furnace in that the location of the workload temperature sensing thermocouple can be extremely critical and once the manufacturer has installed the furnace for the customer's use, the manufacturer loses control over the exact location of such a thermocouple in any given processing of a workload. Accordingly, it would be extremely desirable to provide a control system for a heat-treating furnace wherein a thermal head is maintained for rapidly bringing the workload up to temperature without any undesirable overshoot of the workload completely independent of any actual measurement of the workload temperature.

It has been recognized in the heat-treating furnace art that periodically reversing the gaseous heating media is of assistance in more rapidly bringing the workload up to the preselected processing temperature. When the incoming gaseous heating media passes through or across the load, the load absorbs heat from the heating media and thereby "chills" the heating media. Therefore the end of the workload at the outgoing side is subjected to a temperature that is, particularly at the initial stages of bringing the work up to heat, considerably lower than the incoming heating media temperature. Inasmuch as within any given reversing cycle each end of the workload is subjected to the hotter incoming temperature it is apparent that the overall time for bringing the load up to temperature must be shorter. It would be desirable in such a reversible circulation heating media system to have means for measuring the incoming and outgoing temperature of the media during both portions of the reversing cycle in order to properly control the heat input to the furnace.

Summary of the Invention

The present invention is concerned with a simplified means of controlling the heat input to a heat-treating furnace so as to maintain a thermal head for rapidly bringing the workload up to the preselected processing temperature without any undesirable overshoot of the workload temperature solely as a function of the temperatures of the heating media. The control system is preferably used in a furnace having a reversible axial flow fan for circulating a gaseous heating media. The furnace can be of any conventional construction such as a direct fired car bottom furnace. Electrical signals proportional to the temperature of the incoming heating media are compared to a fixed reference signal to establish a maximum temperature for the incoming media. Electrical signals directly proportional to either the incoming or outgoing temperatures of the media may be compared against a variable reference point which is a function of the difference between the incoming and outgoing temperatures of the media to decrease the incoming temperature of the media so as to prevent any undesirable overshoot of the workload temperature or electrical signals directly proportional to the outgoing temperature of the media may be compared against a fixed reference point to establish a maximum temperature for the outgoing media.

Accordingly it is an object of the present invention to provide a simplified, less expensive furnace-heating-control system for rapidly bringing the workload up to the desired processing temperature without any overshoot of the workload.

It is a further object of the present invention to provide an improved furnace-heating-control system for rapidly bringing the workload up to temperature without any undesirable overshoot of the workload temperature which is independent of any actual measurement of the workload temperature.

It is another object of the present invention to provide an improved furnace heating control system which in combination with reversible means for circulating the gaseous heating media rapidly brings the workload up to temperature while providing the precise control necessary to prevent any overheating of the workload.

It is an additional object of the present invention to provide a furnace-heating-control system which is dependent upon the measurement of only two variables yet serves to rapidly bring the workload up to temperature without any undesirable overshoot of the workload.

Further objects and advantages of the present invention will become apparent as the following description proceeds and the features of novelty which characterize the invention will be particularly pointed out in the claims annexed to and forming a part of the specification.

DESCRIPTION OF THE DRAWINGS

For a better understanding of the present invention, reference may be had to the accompanying drawings in which:

FIG. 5 is a schematic diagram of an alternate embodiment of the heating control system.

DESCRIPTION OF THE PREFERRED EMBODIMENT

Figure 1:
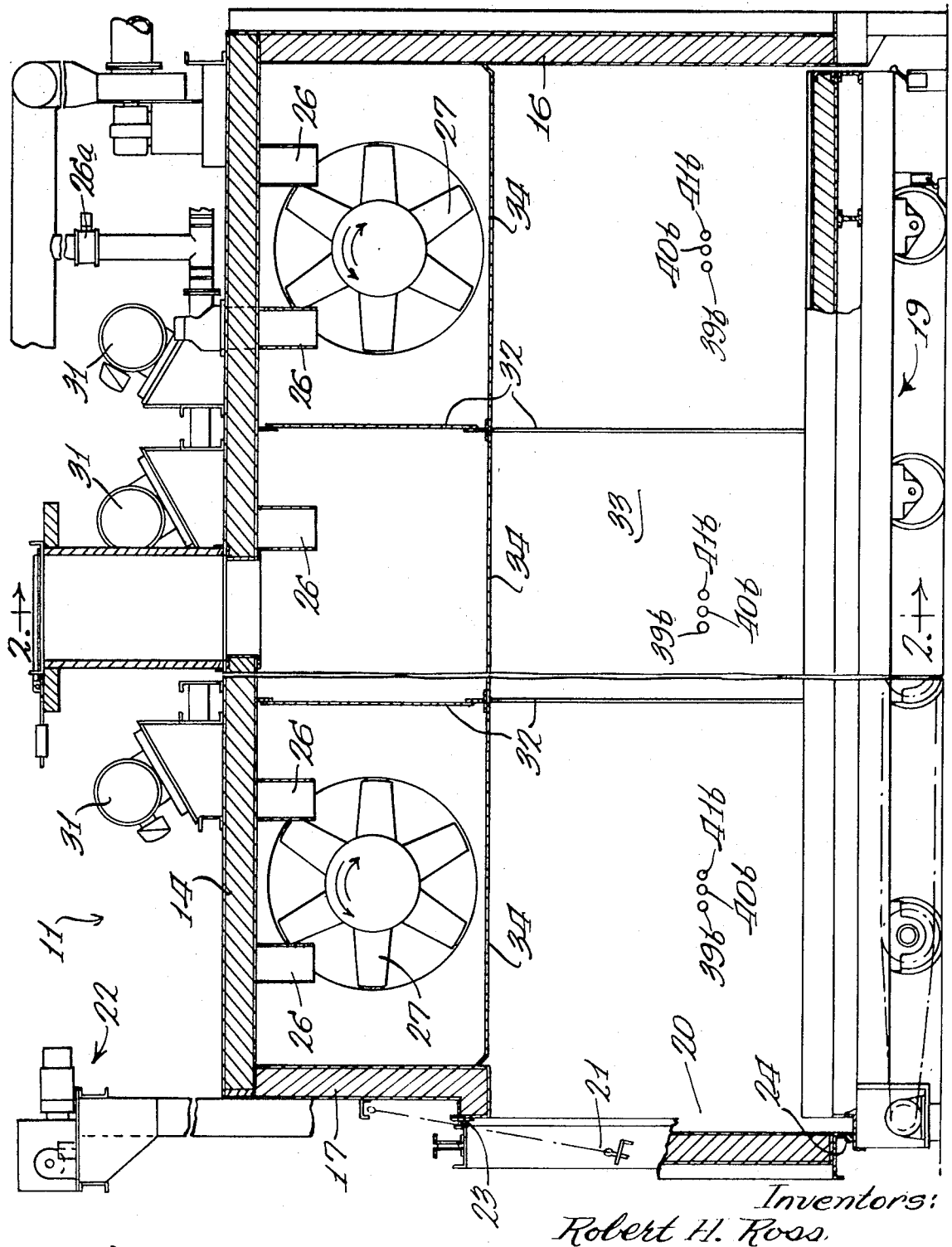
FIG. 1 is a longitudinal cross-sectional view of an aluminum homogenizing furnace embodying our invention.
Figure 2:
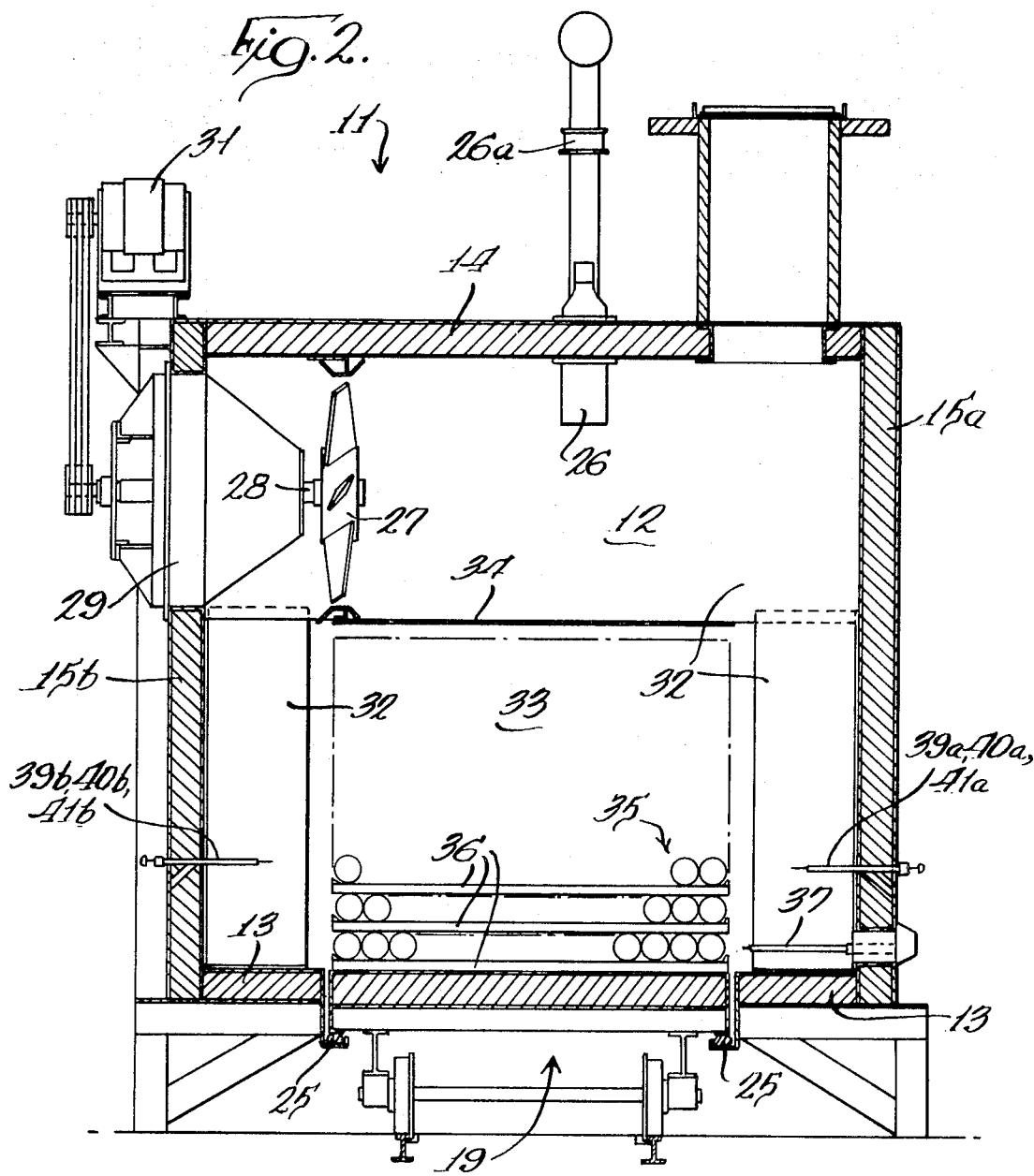
FIG. 2 is a sectional view taken substantially on line 2—2 of FIG. 1.

Referring now to the drawings in which like parts are designated by like reference numerals in the various views there is shown in FIGS. 1 and 2 an aluminum homogenizing furnace designated generally by the reference numeral 11. The furnace comprises an enclosure 12 having a floor 13, a roof 14 and sidewalls 15a and 15b, rear wall 16 and front wall 17. The floor 13 is adapted to receive a movable car bottom workload supporting structure generally designated as 19. The front wall 17 has an opening 20 to permit the insertion and removal of the car bottom 19. A door 21 is mounted for vertical slidable movement by door hoisting means generally designated by reference numeral 22 into and out of a position adjacent to the front opening 20 for sealing the furnace enclosure 12. Suitable conventional sealing means such as 23 and 24 shown in FIG. 1 are provided in the spaces between the door in its enclosure sealing position and the enclosure walls to prevent the escape of heat from the enclosure. Similar conventional sealing means 25 are shown in FIG. 2 in the spaces between the car bottom and the enclosure floor 13.

The furnace shown in FIGS. 1 and 2 is a direct fired furnace wherein the products of combustion of the burners 26 are admitted directly into the furnace enclosure 12 from burners 26. It will be apparent to those skilled in the art that while the furnace disclosed in this embodiment is a direct fired furnace it can just as well be a radiant tube or electrically heated furnace. Heat input control valves, such as that shown only for the rear zone of the furnace in FIG. 1 and designated by reference numeral 26a, control the fuel-air mixture to the burners for each of the zones to increase or decrease the heat input as required by the control system. The gaseous heating media heated by the burners 26 is circulated through the furnace enclosure by means of an axial flow fan 27 having a fan shaft 28 extending through sidewall 15b. Suitable means of conventional construction designated generally by reference numeral 29 are mounted within sidewall 15b to provide bearings for the fan shaft 28 and to seal against the loss of heat from furnace enclosure 12. Fan belt 30 drivingly connects fan shaft 28 with the output shaft of a reversible motor designated by reference numeral 31.

As shown in FIG. 1 this furnace is a three-zone furnace, however, the number of zones form no part of the instant invention as the control system can be used in a furnace having a single zone or any multiple number of zones. In a multiple zone furnace such as that shown in longitudinal cross section in FIG. 1, each zone should be substantially equal in length and have a reversible axial flow fan 27, however, in order to fit FIG. 1 on the sheet in a suitable scale, a portion of the central zone has been cut away and the fan has been deleted from the partially shown center zone for illustrative purposes only. Each of the axial flow fans 27 should preferably be independently reversibly driven by means of similar motors 31. In a multiple zone furnace vertical baffles 32 are provided to separate the zones. The baffles 32 are so designed as to leave a single unobstructed work-receiving area generally designated by reference numeral 33. A horizontal baffle 34 is provided above the work area in each of the zones for controlling the circulation of the heating media by axial fan 27 in a transverse "circular" pattern through the furnace enclosure 12 and the work area 33 therein.

In FIG. 2 there is shown a workload consisting of a number of aluminum billets designated generally by reference numeral 35 stacked with their axes parallel to the longitudinal direction of the furnace Each level of aluminum billets is separated by suitable spacers 36 to facilitate circulation of the heating media through the workload. Although not forming any part of this invention a load probe thermocouple 37 is shown in FIG. 2 extending through the sidewall 15a. This thermocouple 37 is provided so that the operator may from time to time check the actual temperature of the load although it is certainly not necessary to do so in order to provide proper heat treatment while using the control system of this invention.

A set of three thermocouples 39a, 40a and 41a extends through one of the sidewalls into each zone of the furnace enclosure and a corresponding set, 39b, 40b and 41b, extends through the opposite sidewall into each zone. These thermocouples all measure the temperature of the heating media for purposes which will be apparent from the following description.

Figure 3:
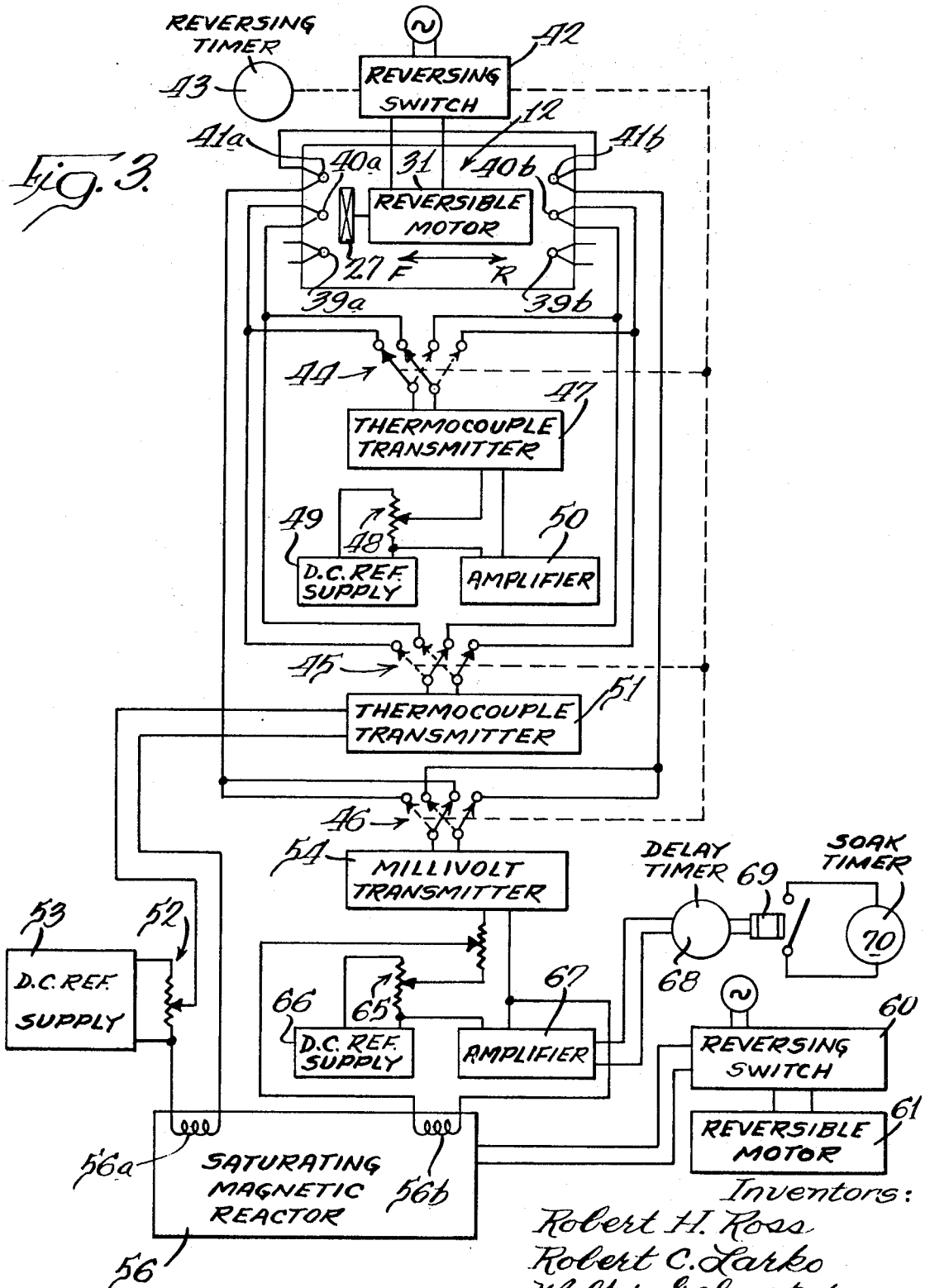
FIG. 3 is a schematic diagram of the heating control system.

Referring now to FIG. 3 there is a diagrammatical showing of the furnace enclosure 12 as well as the axial flow fan 27 and its reversible driving motor 31 which have previously been described in greater detail. The showing in this schematic diagram is for a control system for a single zone furnace. However, it will be apparent to those skilled in the art that the control system shown and described herein may be adapted for use in a multizone furnace by providing a time-sharing rotary program controller, i.e., a repeat cycle timer, which will sequentially connect the thermocouples of the various zones by suitable relays in the manner and for the purposes which are described herein with respect to a single-zone control system to obtain independent sequential control of each zone. The thermocouples 39a and 39b extending through each of the opposite sidewalls of the diagrammatical showing of the furnace enclosure 12 in FIG. 3 are merely for the purpose of recording the incoming and outgoing temperature of the heating media. Thermocouples 39a and 39b are connected to a conventional multipoint temperature recording instrument, not shown herein. These thermocouples may be synchronously switched with the reversal of the fan motor in a manner which will be described in greater detail with respect to thermocouples 40a, 40b, 41a and 41b so as to provide a continuous readout of the incoming and outgoing heating media regardless of the direction of the circulation of the media through the workload.

A reversing switch 42 of conventional construction is connected to fan motor 31. The reversing switch can be automatically controlled by means of the reversing timer 43. It has been found advantageous to select a reversing timer which can be set for a dwell period between actual reversals of the fan motor 31 in order to avoid undue strain on the fan driving belts 30 upon reversal of the fan. A dwell period in the magnitude of 30 seconds does not effect the efficiency of the control system and is sufficient under normal circumstances to prevent undue strain on the fan belt.

When the fan shown in FIG. 3 is operated in the direction of the arrowhead marked F, the temperature of the incoming heating media, prior to its passing through the workload, is sensed by the thermocouples 40a and 41a, and the outgoing temperature of the heating media after it has passed through the load is sensed by the thermocouples 40b and 41b. As the workload of a heat-treating furnace is being brought up to the preselected processing temperature, there must necessarily be a drop or difference between the incoming temperature of the heating media and the outgoing temperature of the heating media due to the chill effect of the workload. As will be noted from FIG. 3, thermocouples 41a and 41b are inversely connected so as to produce a signal directly proportional to the chill or temperature difference which can be designated as $\Delta T$, the incoming temperature, $T_I$, less the outgoing temperature, $T_O$, and may be mathematically stated as follows:

$T_I - T_O = \Delta T$ If thermocouples 41a and 41b are synchronously switched with the reversal of the fan 27, they can always produce a positive signal inasmuch as the incoming temperature must always be in excess of the outgoing temperature due to the chill effect of the load.

As indicated by the dotted line showing, the thermocouple selector switches generally designated by reference numerals 44, 45 and 46 are interconnected to the reversing switch 42 so as to synchronously select the proper thermocouples for sensing the incoming or outgoing temperature in relation to the direction of rotation of the fan 27. The interconnection of the selector switches with the reversing switch 42 may be accomplished by means of suitable relays which are not shown. As previously mentioned the schematic in FIG. 3 is drawn to indicate a point in time when the axial flow fan 27 is circulating the heating media in the direction of the arrowhead marked F. Therefore, as indicated by the solid line showings of the selector switches 44, 45 and 46, thermocouple 40a is sensing the incoming temperature and thermocouple 40b is sensing the outgoing temperature, while thermocouples 41a and 41b are connected in such a manner so as to produce a positive signal directly proportional to the temperature difference $\Delta T$.

In order to maintain a thermal head without any overheating of the workload beyond the preselected processing temperature for the workload, or work set point, $W_S$, solely as a function of the temperature of the incoming and outgoing media, the control system of the present invention provides for the incoming temperature $T_I$ to be raised to, and be maintained at, an empirically preselected maximum temperature, $T_{max}$. The incoming temperature is maintained at this maximum preselected value until a point in the initial heat up cycle when the outgoing temperature, $T_o$, becomes greater than the work set point plus a ratio of the temperature difference which may be mathematically stated as follows:

$T_o > W_s + k\Delta T$ The ratio, $k$, may be preselected for any given heat-treating process and may be equal to or greater than zero. As will be explained in greater detail below, when the outgoing temperature signal exceeds the work set point signal plus the ratio of the temperature difference signal, the heat input to the furnace will be decreased. Therefore, by selecting higher ratio values, the thermal head of the furnace heating media above the work set point will be maintained for a greater period of time, allowing the work to come up to temperature at a more rapid rate. The proper value for the ratio, $k$, is primarily influenced by the chilling characteristics of the load and the flow of the heating media within a particular furnace. Therefore, the ratio, $k$, must be empirically selected to achieve the desired rate for bringing the work load up to temperature without overshoot.

As shown in the schematic diagram, thermocouple 40a is measuring the incoming temperature of the heating media. This temperature value signal is then fed into a thermocouple transmitter 47, such as the one marketed by Acromag, Incorporated under their catalog number 313-BX-20, for converting the thermocouple input signal to a current output signal. The output signal of thermocouple transmitter 47 is then compared with a fixed reference signal, $T_{max}$, that is directly proportional to a preselected maximum temperature value for the incoming heating media. This fixed reference signal is obtained by means of a variable resistance connected to a DC reference supply designated by reference numerals 48 and 49, respectively. Any positive signal due to the incoming temperature exceeding the preselected maximum is then fed into an amplifier 50 to activate reversing switch 60 which reverses motor 61. Reversing switch 60 and reversible motor 61 may be anyone of a number of suitable commercially available reversing switches and reversible motors. Reversible motor 61 is connected to control valve 26a for regulating the amount of heat input through the burners 26. The reversible motor 61 and the control valve 26a are connected in a manner such that prior to a signal from amplifier 50 effecting reversal of the motor, the motor drives the control valve to an opening position so as to permit the increase of heat input through the burners 26. Accordingly, when the signal from amplifier 50 through reversing switch 60 reverses the motor 60, the control valve is driven to a closing position thereby decreasing the amount of heat input through the burners to maintain the heat input below the preselected value, $T_{max}$.

The electrical signal directly proportional to the outgoing temperature of the heating media as measured by thermocouple 40b is fed through the selector switch 45 to thermocouple transmitter 51 similar to the previously described thermocouple transmitter 47. The current output signal of thermocouple transmitter 51 is compared with a preselected reference signal, directly proportional to the work set point temperature, $W_s$, obtained by means of the variable resistance 52 and the DC reference supply 53. Any positive resulting signal due to the outgoing temperature exceeding the work set point temperature is then fed into winding 56a of saturating magnetic reactor 56 for purposes which will later be described.

The electrical signal proportional to the temperature difference, $\Delta t$, as sensed by the thermocouples 41a and 41b is fed through the selector switch 46 into a millivolt transmitter 54, such as that sold by Acromag, Incorporated designated by their catalog number 312-BX-20, for the purpose of converting a millivolt input signal to a current output signal. A preselected ratio of the current output signal from millivolt transmitter 54 is obtained from the setting of the variable resistance 55 and is fed into winding 56b of the saturating magnetic reactor 56. This reactor is wound in a conventional manner such that windings 56a and 56b are in a biasing or opposing relationship and such that the resulting magnetic flux of winding 56a must overcome that of winding 56b in order for the reactor 56 to generate a signal. As will be apparent to those skilled in the art from the foregoing discussion, in order for reactor 56 to generate a signal, the outgoing temperature of the heating media must be greater than the work set point temperature plus the ratio of the temperature difference which may be mathematically stated in a manner more closely corresponding to the schematic shown in FIG. 3 as follows:

$T_o - W_s > k\Delta T$ When the condition as indicated by the above equation is reached, the signal fed through winding 56a overcomes the bias of the signal directly proportional to $k\Delta T$ fed into winding 56b and the reactor 56 puts out a signal to the previously described reversing switch 60. Switch 60 in turn reverses the motor 61 from its normal direction wherein it is driving the heat input valve control to an opening position thereby causing the valve to move to a closing position to reduce the heat input into the furnace enclosure 12 through the burners 26 in the same manner previously described with respect to the signal from amplifier 50.

Thus motor 61 can be reversed from its normal direction wherein it effects an increase of the heat input by either one of two conditions, namely, the incoming temperature exceeding the preselected maximum temperature or the outgoing temperature becoming greater than the work set point plus the preselected ratio of the temperature difference.

Prior to describing the operation of the control system, brief reference will be made to the additional function performed by the current output signal of the millivolt transmitter 54 of initiating soak timer 70. As is shown in FIG. 3 the output signal from the transmitter 54, proportional to the temperature difference, is compared with a fixed reference point which is obtained from the variable resistance 65 and the DC reference supply 66. This preselected reference signal is directly proportional to a low temperature setting in the magnitude of 10° F. such that when the temperature difference becomes less than this setting, amplifier 67 produces a signal. This signal is fed into a short interval, of a magnitude of 4 minutes, delay timer, the purpose of which is to prevent energizing soak timer 70 upon reversal of the fan 27. Immediately following reversal of the fan rotation direction the temperature difference signal from thermocouples 41a and 41b would, for a short increment of time, be less than 10° and would activate the soak timer 70 thereby prematurely starting the soaking period. It has been found that a delay of the signal from the amplifier 67 for a period of approximately 4 minutes is sufficient to preclude any premature activation of the soak timer 70. Therefore, when the amplifier 67 generates a signal in excess of a period of 4 minutes, the relay 69 is activated to energize the soak timer 70 and start the soak period which may be of the magnitude of 30 hours, but, of course, can be preselected to be suitable for the particular heat-treating process for which the control system is being used.

Figure 4:
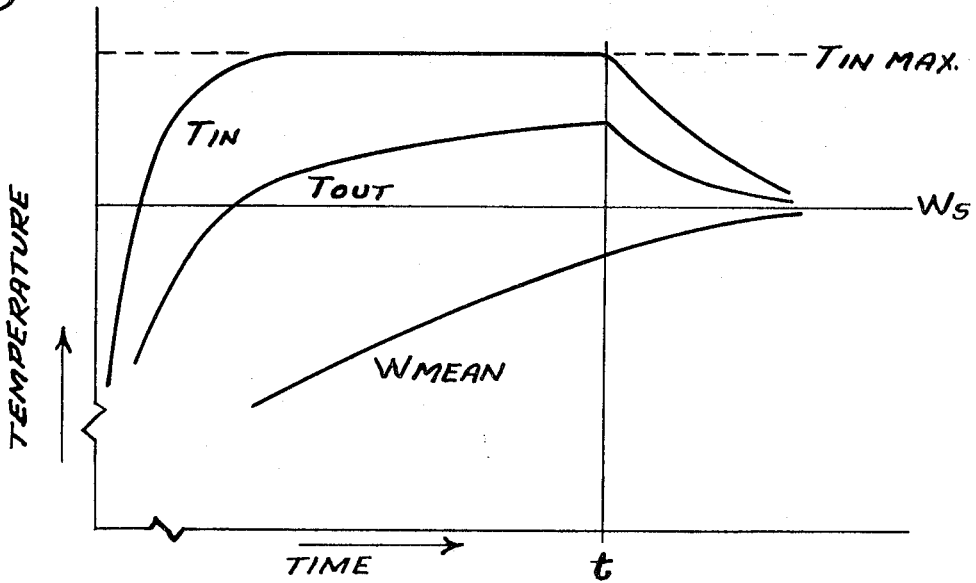
FIG. 4 is a diagram showing the incoming and outgoing temperatures of the heating media and the mean workload temperature within a furnace embodying the control system shown schematically in FIG. 3 plotted against time.

In operation, at the start up of a heat-treating process cycle the work load, carried by the car bottom 19, is inserted into the work area 33 of the furnace enclosure 12. The operator energizes suitable switches, not described herein, to activate the control system and ignite the burners 26. Relatively rapidly after the startup of a loaded furnace the incoming temperature $T_I$ will reach the empirically preselected value $T_{max}$. By means of the previously described control system, comparing $T_I$ to $T_{max}$, and the resulting signal from amplifier 50 when $T_I$ exceeds $T_{max}$, the incoming temperature will be maintained below or equal to $T_{max}$. During this entire period the fan 27 will continue to periodically reverse thereby reversing the direction of circulation of the heating media. As previously described the reversal of circulation will have no effect upon the signal being fed into thermocouple transmitter 47, as by means of the selector switch 44 the thermocouple 40a or 40b actually sensing the incoming temperature at any particular point in time will be connected to transmitter 47. Therefore the incoming temperature will be maintained, during the major portion of this initial heat up of the furnace and the work load, at the preselected maximum temperature by means of either thermocouple 40a or 40b and the control circuitry associated therewith, as when amplifier 50 does not generate a signal as a result of $T_I$ exceeding $T_{max}$ the reversing switch 60 will reverse the motor 61 to its normal direction wherein it drives the heat input control valve 26a to an opening position. The incoming temperature of the heating media will be maintained at its maximum preselected value until the outgoing temperature exceeds the work set point plus the ratio of the temperature difference to effect reversal of the motor 61 to drive the heat input valve to a closing position as was previously described. Referring to the graph shown in FIG. 4 wherein the temperatures of the incoming and outgoing heating media are plotted against time for a typical heat-treating process in a furnace using the control system of the present invention, there is shown at a point in time, the effect on the incoming and outgoing temperatures of the control signal generated by reactor 56. When the outgoing temperature reaches a point at which the reactor 56 generates a signal to reversing switch 60, the heat input valve 26a will be driven to a closing position thereby decreasing the incoming temperature. Of course, during this entire operation of the furnace, the temperature difference will continue to decrease due to the absorption of heat by the workload. However as the incoming temperature decreases, the outgoing temperature also decreases as a function of the decrease in the incoming temperature in spite of the constant decrease of the temperature difference due to heat absorption by the workload. The temperature difference will decrease as a function of the heat absorption of the load at a relatively show rate, as the rate of absorption of heat by the workload decreases as the thermal head is lowered. Therefore, at some point in time after the signal from the reactor 56 initially reverses the motor 61, the outgoing temperature will again become less than the work set point plus the ratio of the temperature difference which will result in the return of the motor 61 to its normal heat input valve opening driving direction. This reversal of the motor 61 will result in an increase of the incoming temperature. The incoming temperature as well as the outgoing temperature, as a function of the incoming temperature, will increase until the outgoing temperature again exceeds the work set point plus the ratio times the temperature difference. The control system will continue to cycle in the manner described above until the workload is brought up to temperature. As is shown graphically in FIG. 4, after a point in time the incoming and outgoing temperatures of the heating media will, with the mean workload temperature, converge upon the preselected processing temperature, $W_S$.

The foregoing description of the control system of the present invention has been made in terms of obtaining the temperature signal to be compared with the work set point plus a ratio of the temperature difference from the outgoing heating media after it has passed through the workload. However as shown by the following equations, the same control signal can be obtained by comparing a signal directly proportional to the incoming temperature of the media prior to its passing through the workload with the work set point plus a ratio of the temperature difference.

$$T_O = W_S + k\Delta T$$
$$T_I - \Delta T = W_S + k\Delta T$$
$$T_I - W_S = (1+k)\Delta T$$
$$T_I = W_S + K\Delta T$$

As indicated by the above equations the ratio $K$, when the incoming temperature is used, must be equal to or greater than one. The circuit shown in schematic diagram would, of course, have to be modified to use the incoming temperature signal for comparison with the work set point plus the ratio of the temperature difference. A second current output signal from thermocouple transmitter 47, rather than the signal from thermocouple transmitter 51, would be fed into the portion of the circuit comprising variable resistance 52, DC reference supply 53, and winding 56a.

An alternate embodiment of the present invention is shown in the schematic diagram of a control system in FIG. 5. This control system, although it does not provide for maintaining the thermal head for as long a period as that described in the preferred embodiment and, therefore, does not provide as rapid heating of the workload up to the processing temperature, does have the advantage of being a more simplified control system requiring less components. Therefore, this control system results in a less expensive system while still providing for more rapid heating of the workload to the preselected temperature without overshoot than that obtainable by prior art control systems.

The components of the circuit shown in the schematic diagram of FIG. 5 which are identical to those previously discussed with respect to FIG. 3 have been identified by the same reference numerals. In this system the heat input is controlled solely as a function of two variables and two fixed reference signals. The two variables being the incoming temperature and the outgoing temperature of the heating media which are compared respectively to reference signals proportional to a maximum setting for the incoming temperature, $T_{in\cdot TE\cdot max}$, and a maximum setting for the outgoing temperature, $T_{out\cdot TE\cdot max}$.

As in the previously described circuit of FIG. 3, selector switches 44 and 45 are interconnected with the reversing switch 42 for the reversible fan driving motor 31 such that the signal fed into the thermocouple transmitter 47 is always the signal directly proportional to the incoming temperature and the signal fed into the thermocouple transmitter 51 is always directly proportional to the outgoing temperature. The signal from the transmitter 47 is compared as previously discussed with respect to the circuit shown in FIG. 3 to effect reversal of the motor 61 to the heat input valve closing driving direction when the incoming temperature exceeds $T_{in\cdot TE\cdot max}$. The signal from thermocouple transmitter 50, which is a current output signal directly proportional to the outgoing temperature of the heating media, is compared to a reference signal by means of variable resistance 71 and DC reference supply 72. This reference signal is proportional to a preselected maximum temperature value for the outgoing temperature, $T_{out\cdot TE\cdot max}$, which is a value lower than $T_{in\cdot TE\cdot max}$. In many instances, in a given heat-treating process the actual temperature at which the processing is to take place has a tolerance, and the work set point is the nominal desired temperature or the midpoint of the tolerance range. Therefore, $T_{out\cdot TE\cdot max}$ could be selected at the top of the work-processing-temperature-tolerance range and would not result in any overshoot of the work temperature load which would be detrimental to the metallurgical characteristics sought to be obtained by the heat-treating process. The signal resulting from the comparison of the outgoing temperature with $T_{out\cdot TE\cdot max}$ is fed to amplifier 73 when the outgoing temperature exceeds this preselected maximum at the top of the heat-treating processing temperature range. The signal from amplifier 73 effects reversal of the motor 61 in a manner previously described to decrease the heat input by driving the heat input valve 26a to a closing position.

Figure 6:
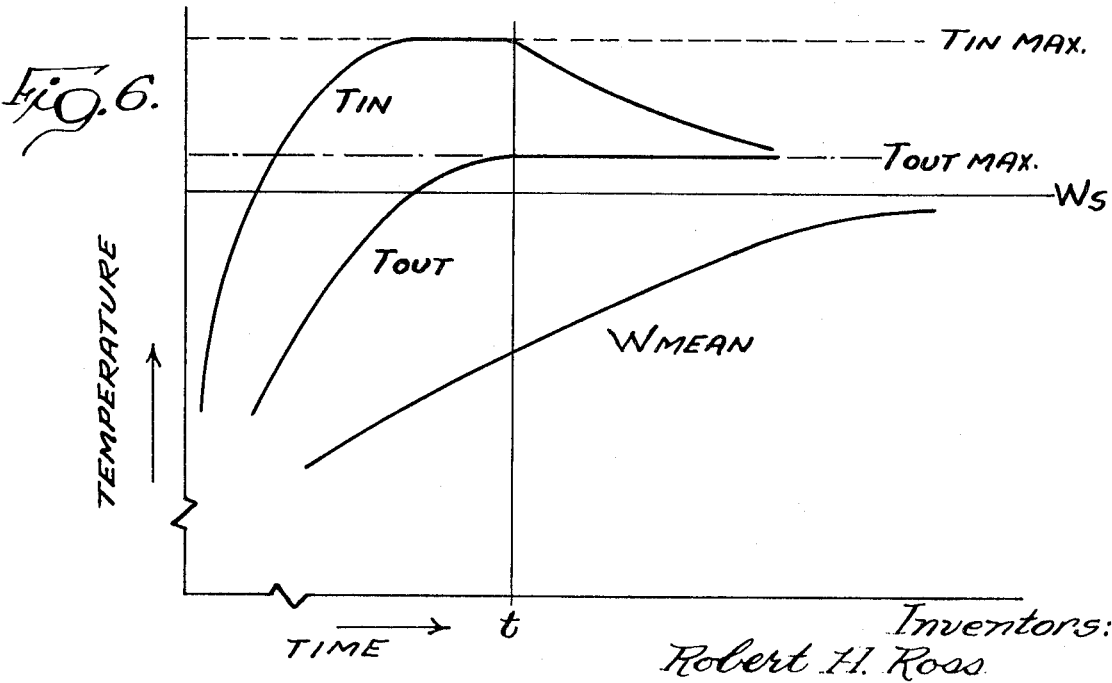
FIG. 6 is a diagram showing the incoming and outgoing temperature and the mean workload temperature within a furnace embodying the control system shown schematically in FIG. 5 plotted against time.

In operation in a furnace using the control system of this alternative embodiment, the incoming temperature would initially, rapidly, rise to the $T_{in\cdot TE\cdot max}$ setting and would be maintained at that setting until the outgoing temperature reached the preselected setting $T_{out\cdot TE\cdot max}$. As shown graphically in FIG. 6 this control system would maintain a thermal head for a period somewhat shorter than that which could be achieved using the automatic control system of the preferred embodiment.

While particular embodiments of the present invention have been shown and described, it will be apparent to those skilled in the art that various changes and modifications may be made without departing from the invention in its broader aspects and it is, therefore, contemplated in the appended claims to cover all such changes and modifications as fall within the true spirit and scope of the present invention.

What is claimed as new and desired to be secured by Letters Patent of the United States is:

1. In a heat treat furnace having a furnace enclosure for containing a workload to be processed, a circulating heating media which passes through the workload, means for heating said media, and reversible means normally operating to increase the heat input to said media, a control system for maintaining the temperature for processing the workload for a time determinable as a function of the temperatures of the heating media as it passes through the workload, comprising first means for generating a first temperature signal directly proportional to the temperature of the heating media prior to said media passing through the workload, second means for generating a second temperature signal directly proportional to a temperature of the heating media, third means for generating a preselected signal and fourth means for generating a reference signal, first circuit means for comparing said first temperature signal with said preselected signal and for generating a first operating signal when said first temperature signal exceeds said preselected signal to reverse said reversible means to decrease the heat input to said media, and second circuit means for comparing said second temperature signal with said reference signal and for generating a second operating signal when said second temperature signal exceeds said reference signal to reverse said reversible means to decrease the heat input to said media.

2. The control system of claim 1 wherein said preselected signal is directly proportional to a maximum temperature setting for the heating media prior to said media passing through the workload, and said reference signal is directly proportional to the preselected temperature for processing the workload plus a preselected ratio of a signal directly proportional to the temperature difference of the media resulting from the media passing through the workload.

3. The control system of claim 2 wherein said second temperature signal is directly proportional to the temperature of the heating media after said media has passed through the workload.

4. The control system of claim 2 wherein said second temperature signal is directly proportional to the temperature of the heating media prior to said media passing through the workload.

5. The control system of claim 1 wherein said preselected signal is directly proportional to a maximum temperature setting for the heating media prior to said media passing through the workload, said second temperature signal is directly proportional to the temperature of the heating media after said media has passed through the workload and said reference signal is a second preselected signal directly proportional to a maximum temperature setting for said heating media after said media has passed through the workload.

6. The control system of claim 5 wherein said maximum temperature for the heating media after said media has passed through the workload is equal to the upper limit of a tolerance range for the preselected workload processing temperature.

7. The control system of claim 2 having a timer to indicate the length of time that the workload has been maintained at the preselected processing temperature, fifth means for generating a second preselected signal directly proportional to a temperature setting and third circuit means for comparing the signal directly proportional to said temperature difference with said second preselected signal and for generating a third operating signal when said temperature difference signal exceeds said second preselected signal to activate said timer.

8. In a heat treat furnace having a furnace enclosure for containing a workload to be processed, means for circulating a heating media through the workload, first reversible means for reversing the direction of circulation of the heating media, means for heating said media, and second reversible means normally operating to increase the heat input to said media, a control system for maintaining the temperature of the heating media at a value in excess of a preselected temperature for processing the workload for a time determinable as a function of the temperatures of the heating media as it passes through the workload, comprising at least first and second thermocouples positioned respectively at opposite ends of the path of circulation of the heating media through the workload, first means including at least one thermocouple for generating a first temperature signal directly proportional to the temperature of the heating media prior to said media passing through the workload, second means, including at least one thermocouple, for generating a second temperature signal directly proportional to a temperature of the heating media, third means for generating a preselected signal and fourth means for generating a reference signal, first circuit means for comparing said first temperature signal with said preselected signal and for generating a first operating signal when said first temperature signal exceeds said preselected signal to reverse said second reversible means to decrease the heat input to said media, second circuit means for comparing said second temperature signal with said reference signal and for generating a second operating signal when said second temperature signal exceeds said reference signal to reverse said second reversible means to decrease the heat input to said media and third reversible means synchronously operable with said first reversing means such that said first thermocouple and said second thermocouple can be automatically selectively interconnected with said first means for generating said first temperature signal and said second means for generating said second temperature signal depending upon the direction of circulation of the heating media.

9. The control system of claim 8 wherein said preselected signal is directly proportional to a maximum temperature setting for the heating media prior to said media passing through the workload, and said reference signal is directly proportional to the preselected temperature for processing the workload plus a preselected ratio of a signal directly proportional to the temperature difference of the media resulting from the media passing through the workload.

10. The control system of claim 8 wherein said preselected signal is directly proportional to a maximum temperature setting for the heating media prior to said media passing through the workload, said second temperature signal is directly proportional to the temperature of the heating media after said media has passed through the workload and said reference signal is a second preselected signal directly proportional to a maximum temperature setting for said heating media after said media has passed through the workload.

* * * * *

UNITED STATES PATENT OFFICE
CERTIFICATE OF CORRECTION

Patent No. 3,620,520          Dated  November 16, 1971

Inventor(s) Robert H. Ross, Robert C. Larko, Walter G. Swartzfager

It is certified that error appears in the above-identified patent and that said Letters Patent are hereby corrected as shown below:

Column 3, line 47, should be -- . -- after the word "furnace". Column 4, line 43, "T " should be -- T --. Column 7, line 33, "show" should be -- slow --. Column 8, line 22, "$T_{in'7E'max}$" should be -- $T_{in-max}$ --; line 23, "$T_{out'7E'max}$" should be -- $T_{out-max}$ --; line 27, delete the word "the" after the word "into"; line 34, "$T_{in'7E'max}$" should be -- $T_{in-max}$ --; line 40, "$T_{out'7E'max}$" should be -- $T_{out-max}$ --; line 41, "$T_{in'7E'max}$" should be -- $T_{in-max}$ --; line 46, "$T_{out'7E'max}$" should be -- $T_{out-max}$ --; line 52, "$T_{out'7E'max}$" should be -- $T_{out-max}$ --; line 60, "$T_{in'7E'max}$" should be -- $T_{in-max}$ --; line 62, "$T_{out'7E'max}$" should be -- $T_{out-max}$ --.

Column 9, line 6, after the word "temperature" the following words were left out -- of the heating media at a value in excess of a preselected temperature --.

Signed and sealed this 30th day of January 1973.

(SEAL)
Attest:

EDWARD M. FLETCHER, JR.
Attesting Officer

ROBERT GOTTSCHALK
Commissioner of Patents